(12) United States Patent
Elliott et al.

(10) Patent No.: US 7,883,054 B2
(45) Date of Patent: Feb. 8, 2011

(54) JAM-TOLERANT ACTUATOR

(75) Inventors: Nicholas Elliott, Bristol (GB); Arnaud Didey, Hants (GB)

(73) Assignee: Airbus Operations Limited, Bristol (GB)

( * ) Notice: Subject to any disclaimer, the term of this patent is extended or adjusted under 35 U.S.C. 154(b) by 221 days.

(21) Appl. No.: 12/279,729

(22) PCT Filed: Mar. 1, 2007

(86) PCT No.: PCT/GB2007/000726

§ 371 (c)(1),
(2), (4) Date: Aug. 18, 2008

(87) PCT Pub. No.: WO2007/099333

PCT Pub. Date: Sep. 7, 2007

(65) Prior Publication Data

US 2009/0021092 A1    Jan. 22, 2009

(30) Foreign Application Priority Data

Mar. 1, 2006  (GB) ................................. 0604131.3

(51) Int. Cl.
B64C 25/24    (2006.01)
(52) U.S. Cl. .................... 244/99.9; 74/89.23; 74/89.35
(58) Field of Classification Search ................ 244/99.9; 254/102; 74/89.23, 89.25, 89.35
See application file for complete search history.

(56) References Cited

U.S. PATENT DOCUMENTS

| 3,335,981 | A | | 8/1967 | Pauli et al. |
|---|---|---|---|---|
| 4,179,944 | A | * | 12/1979 | Conner ...................... 74/89.26 |
| 4,453,114 | A | * | 6/1984 | Nordlund ..................... 318/376 |
| 4,521,707 | A | * | 6/1985 | Baker .......................... 310/80 |
| 4,607,180 | A | * | 8/1986 | Stoody ........................ 310/80 |
| 4,614,128 | A | | 9/1986 | Fickler |
| 4,637,272 | A | * | 1/1987 | Teske et al. ................. 74/89.26 |
| 5,092,539 | A | | 3/1992 | Caero |
| 5,144,851 | A | | 9/1992 | Grimm et al. |
| 5,214,972 | A | | 6/1993 | Larson et al. |
| 5,231,888 | A | * | 8/1993 | Katahira ..................... 74/89.3 |
| 5,649,451 | A | * | 7/1997 | Ruland ....................... 74/89.3 |
| 6,791,215 | B2 | * | 9/2004 | Tesar ........................ 310/12.24 |
| 6,820,715 | B2 | * | 11/2004 | Laurent et al. .............. 180/443 |
| 7,190,096 | B2 | * | 3/2007 | Blanding et al. ............ 310/112 |
| 7,610,828 | B2 | * | 11/2009 | Wingett et al. ........... 74/424.78 |
| 2004/0007923 | A1 | | 1/2004 | Tesar |

FOREIGN PATENT DOCUMENTS

FR    2843181 A1    2/2004

OTHER PUBLICATIONS

UK Search Report for GB0604131.3 dated Jun. 5, 2006.
International Search Report and Written Opinion for PCT/GB2007/000726 dated May 15, 2007.

* cited by examiner

*Primary Examiner*—Burton Mullins
(74) *Attorney, Agent, or Firm*—Lowe, Hauptman, Ham & Berner, LLP

(57) ABSTRACT

An actuator includes first and second linear motion devices, each able to extend the actuator and arranged such that jamming of one of the first and second linear motion devices does not preclude operation of the other. The first linear motion device includes a first linear screw, a first nut, and a first prime mover arranged to impart relative linear motion between the screw and nut. Similarly, the second linear motion device includes a second linear screw, a second nut, and a second prime mover arranged to impart relative linear motion between the second screw and nut.

20 Claims, 3 Drawing Sheets

JAM-TOLERANT ACTUATOR

RELATED APPLICATIONS

The present application is based on International Application Number PCT/GB2007/000726 filed Mar. 1, 2007, and claims priority from British Application Number 0604131.3 filed Mar. 1, 2006, the disclosures of which are hereby incorporated by reference herein in their entirety.

BACKGROUND OF THE INVENTION

The present invention relates to an actuator and in particular, but not exclusively, to a jam-tolerant electromechanical actuator for moving an aircraft component.

Actuators may be used to cause movement of aircraft components such as the landing gear of an aircraft. An actuator system for extending the landing gear of an aircraft should of course be of high integrity and should have a very low risk of failure. For example, it is important for there to be provided a secondary, or emergency, extension system for extending the landing gear from the up-locked position (before landing) and for opening the landing-gear bay doors, in the event of a loss of the normal extension system. Such an emergency extension system should be required not only to extend the landing gear from its up-locked position, but also from any intermediate position in the event of a failure of the gear to retract fully for example.

A landing gear extension system of the prior art, using a hydro-mechanical actuator, comprises both a normal extension system, which relies on active operation of the hydro-mechanical actuator, and an emergency extension system. The emergency extension system, also known as a free-fall system, operates by allowing the gears to extend and the doors to open under gravity. During use of the emergency extension system, the hydraulic fluid dynamics within the hydro-mechanical actuator provides sufficient damping during extension (towards gear down-lock position) to preserve the gear from damage. The configuration of the hydro-mechanical actuator, when the landing gear has reached its fully deployed position, is such that the actuator does not react any load resulting from landing gear or airframe flexure (given that the piston of the hydraulic actuator is not otherwise prevented from sliding inside the cylinder of the actuator).

There is a desire to reduce the reliance on hydraulic systems in large commercial aircraft and thus there is currently a desire to use electric actuators, where previously hydro-mechanical actuators were used. There are two types of electric actuators that might be used, namely, an indirect drive actuator or a direct drive actuator. Indirect drive actuators use gear boxes, worm screws or similar mechanisms to convert the rotating motion of an electric motor into either low-speed/high-thrust linear motion or low speed/high torque rotary motion, whereas direct drive actuators (also known as linear motors) directly convert electricity into linear motion.

Direct drive actuators are highly reliable, but may not be capable of meeting the extension/retraction requirements of certain applications in an aircraft. Indirect drive actuators are capable of meeting many of the requirements (such as mass, volume occupied, power output, and extensions achievable), but are more likely to jam than direct drive actuators or hydraulic cylinders as a result of the mechanisms used to convert motion of the motor to the actuating motion required.

The present invention seeks to provide an actuator that mitigates one or more of the above-mentioned disadvantages. Alternatively or additionally, the present invention seeks to provide an improved actuator. Alternatively or additionally, the present invention seeks to provide a jam-tolerant actuator for use on an aircraft, that does not need to rely on a central hydraulic system of the aircraft, the actuator for example being in the form of an electric indirect drive actuator.

SUMMARY OF THE INVENTION

The present invention provides an actuator comprising first and second linear motion devices, wherein
the first linear motion device comprises a first linear screw, a first nut, and a first prime mover arranged to impart relative linear motion between the first linear screw and the first nut,
the second linear motion device comprises a second linear screw, a second nut, and a second prime mover arranged to impart relative linear motion between the second linear screw and the second nut,
the actuator is arranged to be extended as a result of relative linear motion between the first linear screw and the first nut or relative linear motion between the second linear screw and the second nut, and
the first and second linear motion devices are arranged such that jamming of one of the first and second linear motion devices does not preclude operation of the other of the first and second linear motion devices.

The actuator is therefore jam-tolerant in that if one of the first and second linear motion devices jams, the other may still be used to extend the actuator. In some embodiments the first and second linear motion devices may be arranged such that the actuator may be moved to a fully extended position by operation of the first linear motion device only or by operation of the second linear motion device only. In other words, both the first and second linear motion devices may be arranged to independently enable a full extension of the actuator in the event of the failure of the other linear motion device.

Of course, at least one, and preferably both, of the first and second linear motion devices is conveniently arranged to cause movement that effects retraction of the actuator. In certain applications, retraction of the actuator may be much less important than the ability to extend reliably the actuator.

There are examples of electric actuators in the prior art that provide tolerance to jamming, including the disclosures of U.S. Pat. Nos. 4,637,272 and 5,144,851. Each describes an electric actuator that is jam-tolerant and has a certain amount of dual-redundancy, but both electric actuators suffer from significant disadvantages. The actuator of U.S. Pat. No. 4,637,272 is provided with a single common linear screw, associated with two separate and independent drive units. Such an arrangement has the undesirable result of the length of the actuator being longer than necessary. The actuator of U.S. Pat. No. 5,144,851 is provided with a single common motor, but has dual power paths, enabling the actuator to be tolerant to the jamming of either one of the power paths. The actuator of U.S. Pat. No. 5,144,851 is not however tolerant to failure or jamming of the motor.

Preferably, the axes of the first and second linear screws are arranged to be parallel. Parts of the first and second linear screws may be arranged to be at the same position in the direction along the length of the screws when the actuator is in a retracted position. Such an arrangement can provide significant savings on the space occupied by the actuator. A part of the first and second linear screws may be arranged to be accommodated within at least a part of the other of the first and second linear screws when the actuator is in a retracted position. For example, one of the linear screws may have a bore formed along at least part of its length defining an opening at one end of the screw, the other of the linear screws being accommodated within the bore.

The first linear motion device may be back-driveable. During use of the actuator, this may allow there to be limited movement of the actuator to take up movement, for example resulting from flexure of the component on which the actuator acts or flexure of the structure which accommodates the actuator, thereby enabling any resulting loads that are reacted through the actuator to be reduced or eliminated.

The first linear motion device may be arranged to be the primary means for causing the actuator to extend and retract. Thus, the second linear motion device may be considered as a back-up means in the event of failure of the first linear motion device. Particularly in the case where the second linear motion device acts as a back-up means, the second linear motion device may be arranged to be not back-driveable. The second linear motion device may thus be able to act not only as an actuating means but may also be able to retain a position under load without needing the second motor to impart torque to any part of the device. The second linear motion device may be back-driveable with low efficiency. Both the first and second linear motion devices may be back-driveable, but the second device may have a mechanical efficiency lower than that of the first device. The second device may therefore need to be additionally provided with a brake to be able to retain a position under load.

Either or both of the first and second linear motion devices may be arranged such that the linear screw and the nut of the device are in the form of a roller-screw and nut assembly. The roller-screw and nut assembly may be in any suitable form and may for example be a planetary roller screw and nut assembly or a recirculating roller screw and nut assembly. The linear screw and nut may also be in the form of a recirculating ball screw and nut assembly. The linear screw and nut may also be in the form of an acme screw and nut assembly.

The prime mover of either or both of the first and second linear motion devices may be an electric motor. The prime mover associated with the first linear motion device may be larger, more massive and/or more powerful than the prime mover of the second linear motion device.

The prime mover of either or both of the first and second linear motion devices may be directly coupled to the linear screw and nut assembly. The prime mover may also be indirectly coupled to the linear screw and nut assembly, for example via a gear box.

The relative linear motion able to be caused by one of the first and second linear motion devices may cause relative linear motion between the nut and the prime mover of the linear motion device. The relative linear motion able to be caused by one of the first and second linear motion devices may cause relative linear motion between the linear screw and the prime mover of the linear motion device. One of the linear motion devices may cause relative motion between the nut and the prime mover of that linear motion device, whereas the other linear motion device may cause relative motion between the linear screw and the prime mover of that other linear motion device. The relative linear motion able to be caused by one of the first and second linear motion devices may cause linear motion of at least one of the first and second prime movers.

The actuator is preferably so structured as to be suitable for causing movement of an aircraft component, such as for example a landing gear.

The present invention further provides a landing gear assembly including a landing gear leg for supporting at least one wheel of an aircraft, and an actuator arranged to extend the landing gear leg, the actuator being an actuator according to any aspect of the invention described herein. The present invention yet further provides an aircraft including such a landing gear assembly. The aircraft may be heavier than 50 tonnes dry weight, and more preferably heavier than 200 tonnes dry weight. The aircraft may be of a size equivalent to an aircraft designed to carry more than 75 passengers, and more preferably more than 200 passengers. It will of course be appreciated that features of aspects of the invention relating to the actuator of the invention may be incorporated into the landing gear assembly and the aircraft of the invention.

There is also provided a kit of parts for manufacturing an actuator according to any aspect of the invention described herein. The kit may comprise at least the first and second linear screws, and the first and second linear nuts. The kit may also include the first and second prime movers. It will of course be appreciated that features of aspects of the invention relating to the actuator of the invention may be incorporated into this aspect of the invention relating to a kit of parts.

DESCRIPTION OF THE DRAWINGS

An embodiment of the invention will now be described, by way of example only, with reference to the accompanying drawings of which.

DETAILED DESCRIPTION

The Figures illustrate an embodiment of the invention relating to a jam-tolerant electro-mechanical indirect drive actuator for use in a nose landing gear extension and retraction system on a large commercial passenger aircraft. An advantage of the actuator according to the embodiment, over electric direct-drive linear motors, is its ability to convert high-speed low-torque rotary motion from the electric motor into low-speed/high-torque motion.

Figure 1:
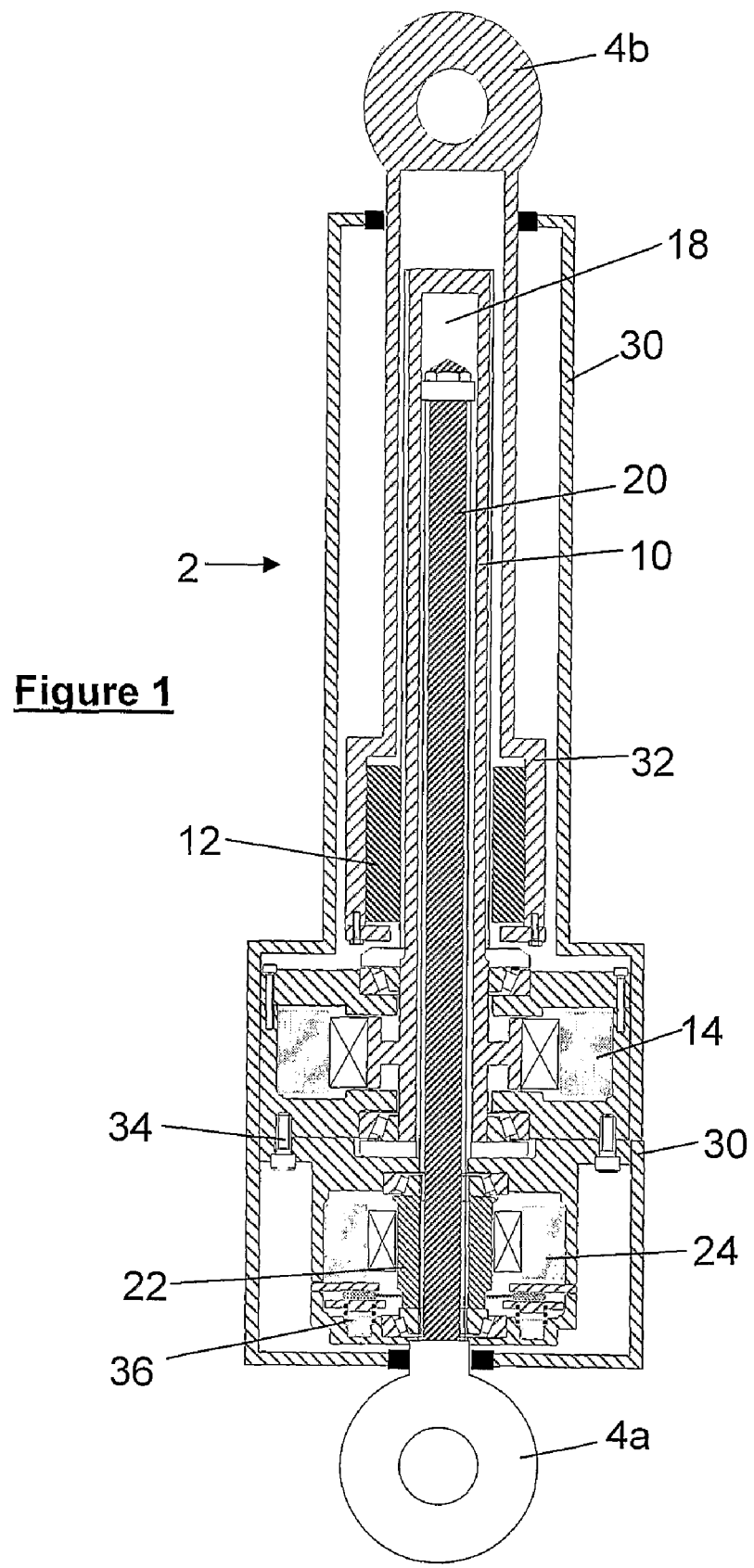
FIG. 1 is a sectional view of an actuator according to an embodiment of the present invention, FIGS. 2a to 2c together show an exploded sectional view of the components illustrated by FIG. 1, and FIGS. 3a to 3d show sectional views of the actuator in various different states.

FIG. 1 shows, in sectional view, an indirect drive actuator according to an embodiment of the present invention. The actuator 2 comprises first and second linear motion devices, each able to cause the actuator to extend, and if previously extended by that device to retract, depending on the direction in which the device is driven. Thus the opposite ends 4a and 4b of the actuator, at which the actuator may be connected to a fixed structure and a component to be moved, respectively, may be moved apart from each other or towards each other. The actuator is coupled to the nose landing gear by connecting the moveable end 4b of the actuator 2 to the landing gear leg.

Each linear motion device comprises a linear screw, in the form of a roller screw, a planetary roller nut mounted for rotation about, and for travelling up and down the length of, the screw, and an electric brushless DC motor for imparting relative motion between the nut and screw. Thus, a first linear screw 10, a first nut 12, and a first electric motor 14 form a first linear motion device and a second linear screw 20, a second nut 22, and a second electric motor 24 form a second linear motion device. The motors 14, 24 are both housed at one end of a main housing 30 that extends beyond the motors to accommodate both linear screws 10, 20 along substantially the entire length of the screws, when the actuator 2 is in the retracted position (the position shown in FIG. 1).

The first linear screw 10 has an interior surface that defines a bore 18 in which the second linear screw 20 is accommodated. The first linear screw 10 is a high efficiency, back-driveable screw, which is directly coupled to the first motor 14, so as to avoid the use of a gear box, which might otherwise increase the risk of jamming. The second linear screw 20 is a low-efficiency (small pitch) non back-driveable screw. Also, the second screw 20 is driven indirectly by the second motor 24, which is smaller and less powerful than the first motor 14.

One end 4a, which is connected to an adjacent fixed structure of the aircraft, of the actuator 2 is positioned at the end of the second linear screw 20. The other end 4b, which is connected to the nose landing gear leg, is defined by the end of a nut housing 32 that is coupled to, and accommodates, the first nut 12. Thus one end 4a of the actuator 2 may be referred to as the fixed end 4a, whereas the other end 4b may be referred to as the moveable end 4b.

The first electric motor 14 is arranged to rotate the first linear screw 10 causing the nut 12 to travel linearly along the length of the linear screw. The movement of the nut 12, being coupled to the nut housing 32, causes the nut housing 32 and therefore the moveable end 4b of the actuator to move relative to the fixed end 4a. Thus the actuator 2 is able to be extended or retracted as a result of relative linear motion between the first linear screw 10 and the first nut 12.

The second electric motor 24 is arranged to rotate the second nut 22, causing the nut 22 to travel linearly along the length of the linear screw 20. The nut 22, which is coupled to the second electric motor, which in turn is coupled to the main housing 30, moves together with the main housing 30, the motors 14, 24, the first linear screw 10, the first nut 12 and the nut housing 32. The movement of the nut 22, thus causes the moveable end 4b of the actuator to move relative to the fixed end 4a. Thus the actuator 2 is able to be extended as a result of relative linear motion between the second linear screw 20 and the second nut 22.

The first and second linear motion devices are arranged to be operable independently of each other. Thus, jamming of the first linear motion device does not preclude operation of the second linear motion device. The actuator is therefore jam-tolerant in that there is dual redundancy in the actuator by means of the provision of first and second independent linear motion devices.

The first linear motion device 10, 12, 14 of the actuator 2 acts as the normal extension/retraction system for the landing gear, and is therefore designed for full duty cycle (i.e. the full operational life of the aircraft). Under normal operation, the actuator 2 is, by means of operating the first linear motion device 10, 12, 14, capable of extending (or retracting) a landing gear within 12 seconds. As mentioned above, the roller screw and nut assembly 10, 12 of the first linear motion device is back-drivable and is therefore able to reduce loads reacted during airframe/gear flexure in any configuration of the actuator (either fully extended or retracted). The first linear motion device includes a brake (not shown) to brake the motor 14 and therefore hold the actuator 2 in the extended position. The second linear motion device 20, 22, 24 provides an emergency extension capability in the event of a loss of power to, or a jam of, the first device. The screw 20 and nut 22 of the second linear motion device is nominally non-back driveable but a brake 36 is provided for braking the motor 24. The second linear motion device 20, 22, 24 is designed for a limited duty cycle only, which is acceptable given that the second linear motion device is only provided as a back-up system for use primarily in emergencies. Designing the second linear motion device 20, 22, 24 for a limited duty cycle only may enable the size of the second linear device 20, 22, 24 to be reduced (for example in comparison to the first linear motion device 10, 12, 14). Accordingly, in the illustrated embodiment the second linear motion device 20, 22, 24 is sized to fit inside the first linear motion device 10, 12, 14, thereby helping to keep the overall length of the actuator short.

The actuator stroke is about 350 mm and the actuator travel is about 370 mm (there being about 10 mm over-travel at either end). The length of the actuator when fully retracted is about 850 mm and its diameter is about 240 mm at its widest. The actuator thrust when the first linear motion device is operated is about 75 kN. The maximum mechanical power needed to generated this thrust is about 2.2 kW, corresponding to a maximum electrical power draw of the first motor 14 of the actuator of approximately 5 kW. The total weight of the actuator is approximately 20 kg.

Figure 2A:
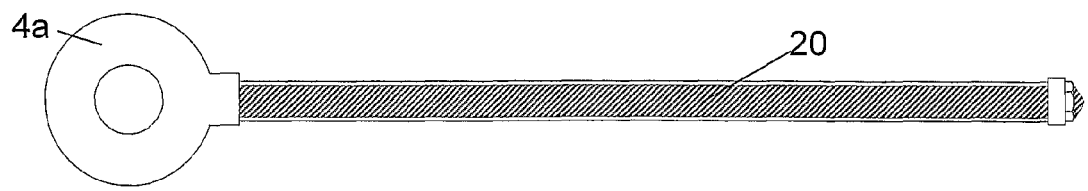
Figure 2B:
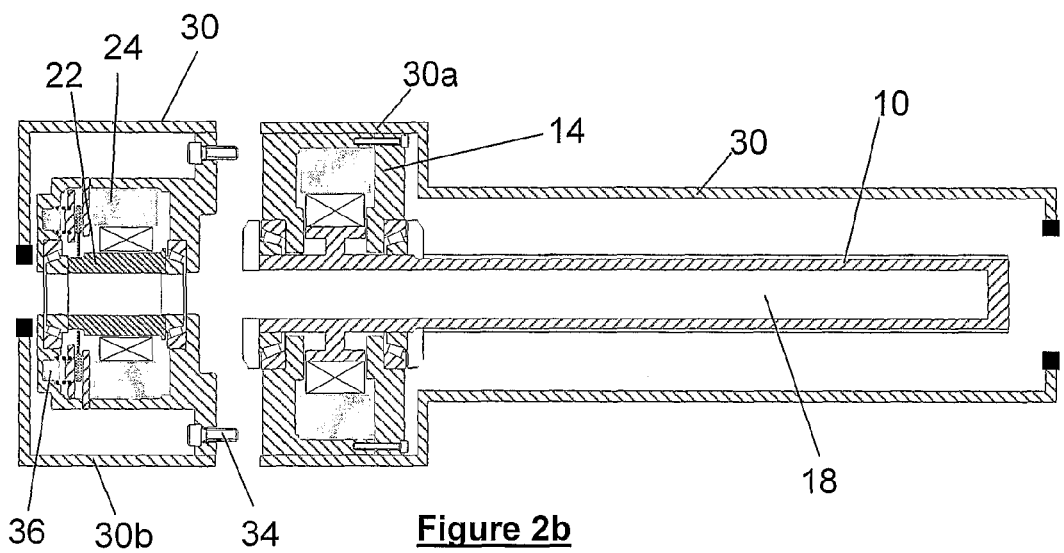
Figure 2C:
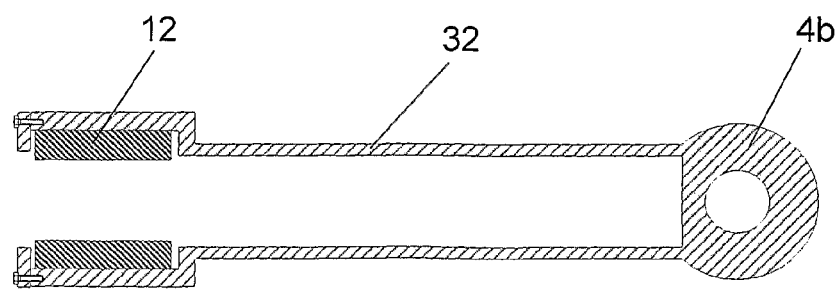

The component parts of the actuator are shown as an exploded sectional view in FIGS. 2a, 2b and 2c. FIG. 2a shows the second linear screw 20 and the left-hand fixed end 4a of the actuator integrally formed therewith. FIG. 2b shows the first motor 14 housed in a first part 30a of the main housing 30, that also accommodates the first hollow screw 10. FIG. 2b also shows the second motor 24 housed in a second part 30b of the main housing 30, that also accommodates the second nut 22 and a brake 36 mounted between nut 22 and the second part 30b of the main housing 30. In use the two parts 30a, 30b of the housing 30 are bolted together by means of a plurality of bolts 34 provided for that purpose. FIG. 2c shows the nut housing 32 that accommodates the first nut 12 and that includes the right-hand moveable end 4b of the actuator 2. The nut housing 32 and the main housing 30 are connected, for example by splines (not shown), to prevent relative rotation between these two components but permit relative linear motion.

Figure 3A:
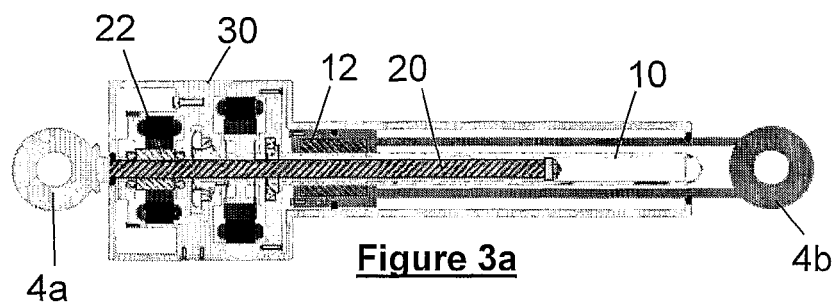
Figure 3B:
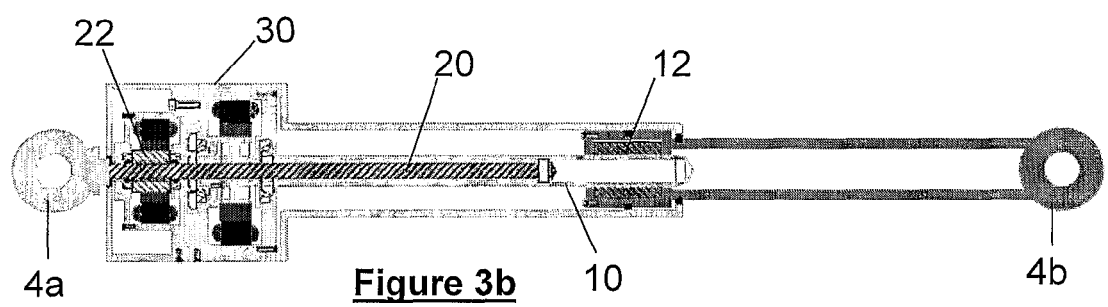
Figure 3C:
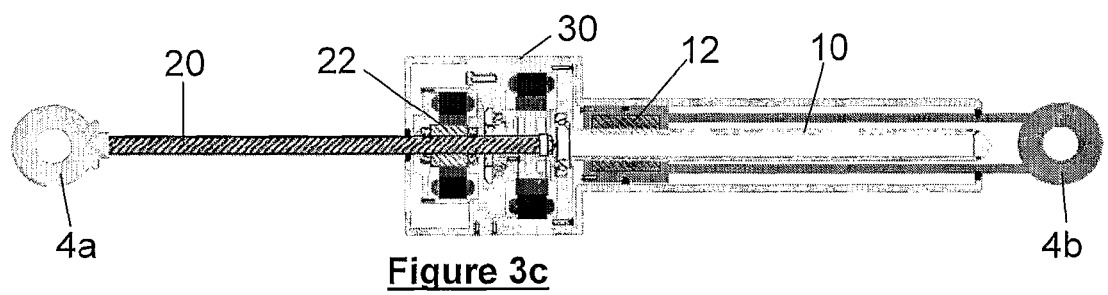
Figure 3D:
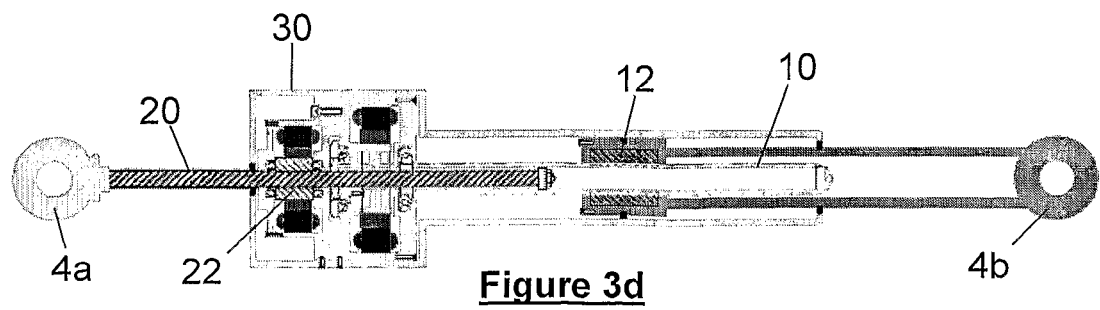

Operation of the actuator will now be described with reference to FIGS. 3a to 3d. FIG. 3a shows the actuator in the fully retracted position. In this position, the first nut 12 is positioned at the left-hand end (as shown in FIG. 3a) of the first screw 10, and the second nut 22 is positioned at the left-hand end of the second screw 20. During normal operation, the first linear motion device is used to extend and retract the actuator 2, which in turn extends and retracts a landing gear of the aircraft. FIG. 3b shows the actuator in its fully extended position resulting from operation of the first linear motion device only. In this position, the first nut 12 is positioned at the right-hand end of the first screw 10, whereas the second nut 22 is positioned at the left-hand end of the second screw 20. If the first linear motion device fails so that it cannot be used to effect any extension of the actuator, the second linear motion device can be used to extend the actuator 2 and therefore the landing gear. FIG. 3c shows the actuator in the fully extended position resulting from operation of the second linear motion device only. In this position, the first nut 12 is positioned at the left-hand end of the first screw 10, whereas the second nut 22 is positioned at the right-hand end of the second screw 20. If the first linear motion device fails during extension of the actuator so that it cannot be used to complete extension, the second linear motion device can be used to complete the extension of the actuator, despite being part extended by the first linear motion device. FIG. 3d shows the actuator 2 moved to the fully extended position as a result of operation of the first linear motion device to move the actuator to a midway position and the subsequent operation of second linear motion device to complete the extension. In this position, the first nut 12 is positioned midway along the first screw 10, and the second nut 22 is positioned midway along the second screw 20. It will of course be seen from FIGS. 3c and 3d that in the event that the second, emergency, linear motion device is used to operate the actuator, the main housing 30 including both motors 14, 24 moves with the moveable end 4b of the actuator 2.

In summary, the embodiment of the invention provides a series redundant actuator consisting of two back-to-back roller screws each featuring an independent electrical motor. As a result of the arrangement and independence of the first and second linear motion devices, the emergency extension capability is provided without the need to disconnect or reconfigure the failed linear motion device.

Advantageously, embodiments of the invention provide an actuator in which the actuator is provided with two fully independent linear motion devices. For example, the linear motion devices of an actuator according to certain embodiments of the invention are not interconnected or interreliant since each motion device is provided with an independent screw, nut and motor. Each motion device may independently act to fully extend the actuator. Whilst the present invention has been described and illustrated with reference to a particular embodiment, it will be appreciated by those of ordinary skill in the art that the invention lends itself to many different variations not specifically illustrated herein.

In the above-described embodiment, only the first linear motion device is able to be used to retract the actuator (once extended by that device) and therefore move the landing gear from the deployed position, or an intermediate position, to a stored position. Thus in that embodiment, if the first linear motion device jams in a partially or fully extended position, the second linear motion device is unable to fully retract the actuator. If however the first linear motion device jams or fails in a fully retracted position, the second linear motion device would be able both to fully extend and then fully retract the actuator. The actuator could be modified so that, in the event of the first linear motion device of the actuator jamming or otherwise failing in any position, the second linear motion device can be used to retract the actuator. For example, such a functionality could be provided by doubling the length of the second screw and centring the screw on the nut (in the neutral position of the second linear motion device). The weight penalty of such modification would be marginal as the screw unit length is low. The second linear motion device may therefore be used for a limited period of time (for example until the end of day) to both extend and retract the actuator and therefore the landing gear, irrespective of the position in which the first linear motion device fails or jams. Aircraft dispatch reliability may thereby be increased.

The first linear screw could be actively monitored through a dedicated health monitoring system to detect and prevent any degradation in performances that could lead to a jam. By monitoring the screw health and repairing any minor defects before they worsen to a state in which there would be a significant risk of jamming, the second, redundant, linear screw can be reserved strictly for emergency use only, requiring reliability over an even lower number of cycles in its lifetime. Such a health monitoring system could include position, force and current sensors to monitor the forces produced by the actuator and to detect wear and degradation.

The above-described embodiment uses planetary roller screws, but any suitable device for converting rotary motion into linear motion may be used, such as for example ball screws.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An actuator structured so as to be suitable for causing movement of an aircraft component which in use may flex, said actuator comprising first and second linear motion devices, wherein
   the first linear motion device comprises a first linear screw, a first nut, and a first prime mover arranged to impart relative linear motion between the first linear screw and the first nut,
   the second linear motion device comprises a second linear screw, a second nut, and a second prime mover arranged to impart relative linear motion between the second linear screw and the second nut,
   the actuator is arranged to be extended as a result of relative linear motion between the first linear screw and the first nut or relative linear motion between the second linear screw and the second nut,
   the first and second linear motion devices are arranged such that jamming of one of the first and second linear motion devices does not preclude operation of the other of the first and second linear motion devices, and
   the first linear motion device is back-driveable.

2. An actuator according to claim 1, wherein
   the actuator is moveable from a fully retracted position to a fully extended position by operation of the first linear motion device only; and
   the actuator is moveable from the fully retracted position to the fully extended position by operation of the second linear motion device only.

3. An actuator according to claim 1, wherein the first linear motion device is configured as a primary mechanism for causing movement of the aircraft component for the operational life of the actuator, whereas the second linear motion device is configured as a back-up device not suitable for use as the primary mechanism for causing movement of the aircraft component for the operational life of the actuator.

4. An actuator according to claim 1, wherein at least a part of one of the first and second linear screws is arranged to be accommodated within at least a part of the other of the first and second linear screws when the actuator is in a retracted position.

5. An actuator according to claim 1, wherein the second linear motion device is not back-driveable or is back-driveable with a mechanical efficiency less than that of the first linear motion device.

6. An actuator according to claim 1, wherein the first linear motion device is a primary mechanism for causing the actuator to extend, and the second linear motion device is a back-up mechanism for causing the actuator to extend in the event of failure of the first linear motion device.

7. An actuator according to claim 1, wherein the first linear screw and the first nut of the first linear motion device constitute a roller-screw and nut assembly.

8. An actuator according to claim 1, wherein the second linear screw and the second nut of the second linear motion device constitute a roller-screw and nut assembly.

9. An actuator according to claim 7, wherein the roller-screw and nut assembly is a planetary roller screw and nut assembly.

10. An actuator according to claim 7, wherein the roller-screw and nut assembly is a recirculating roller screw and nut assembly.

11. An actuator according to claim 1, wherein the first prime mover and the second prime mover are a first electric motor and a second electric motor, respectively.

12. An actuator according to claim 1, wherein
the relative linear motion able to be caused by one of the first and second linear motion devices causes relative linear motion between the nut and the prime mover of said one of the first and second linear motion devices, and
the relative linear motion able to be caused by the other of the first and second linear motion devices causes relative linear motion between the linear screw and the prime mover of said other of the first and second linear motion devices.

13. An actuator according to claim 1, wherein the relative linear motion able to be caused by one of the first and second linear motion devices causes linear motion of at least one of the first and second prime movers.

14. An actuator according to claim 1, wherein the aircraft component is a landing gear.

15. A landing gear assembly, comprising:
a landing gear leg for supporting at least one wheel of an aircraft, and
an actuator according to claim 14 and arranged to extend the landing gear leg.

16. In an aircraft, the improvement comprising:
a landing gear assembly according to claim 15.

17. A kit of parts for manufacturing an actuator which includes first and second linear motion devices and is structured so as to be suitable for causing movement of an aircraft component which in use may flex, said kit comprising:
a first linear screw which is a back-driveable screw,
a first nut engageable with the first linear screw,
a first prime mover arranged to impart relative linear motion between the first linear screw and the first nut, when the first nut is engaged with the first linear screw, to define the first linear motion device for extending the actuator as a result of relative linear motion between the first linear screw and the first nut,
a second linear screw,
a second nut engageable with the second linear screw, and
a second prime mover arranged to impart relative linear motion between the second linear screw and the second nut, when the second nut is engaged with the second linear screw, to define the second linear motion device operable independently of the first linear motion device for extending the actuator as a result of relative linear motion between the second linear screw and the second nut.

18. An actuator for causing movement of an aircraft component, said actuator comprising first and second linear motion devices, wherein
the first linear motion device comprises a first linear screw, a first nut, and a first prime mover arranged to impart relative linear motion between the first linear screw and the first nut,
the second linear motion device comprises a second linear screw, a second nut, and a second prime mover arranged to impart relative linear motion between the second linear screw and the second nut,
the actuator is arranged to be extended as a result of relative linear motion between the first linear screw and the first nut or relative linear motion between the second linear screw and the second nut,
the first and second linear motion devices are arranged such that jamming of one of the first and second linear motion devices does not preclude operation of the other of the first and second linear motion devices, and
rotational motion of any of the first linear screw and the first nut is independent of rotational motion of any of the second linear screw and the second nut.

19. An actuator according to claim 18, wherein
the first linear screw and the first nut are free of direct engagement with any of the second linear screw and the second nut.

20. An actuator according to claim 18, further comprising
a housing accommodating therein the first and second prime movers;
first and second ends moveable relative to each other as the actuator extends or retracts;
wherein said housing and the first and second prime movers accommodated therein are linearly moveable relative to both said first and second ends.

* * * * *